US011422437B2

United States Patent
Chapman

(10) Patent No.: US 11,422,437 B2
(45) Date of Patent: Aug. 23, 2022

(54) TELESCOPING ELECTRIC CAMERA CRANE

(71) Applicant: CHAPMAN/LEONARD STUDIO EQUIPMENT, INC., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 190 days.

(21) Appl. No.: 16/844,688

(22) Filed: Apr. 9, 2020

(65) Prior Publication Data

US 2021/0318595 A1  Oct. 14, 2021

(51) Int. Cl.

| | | |
|---|---|---|
| *G03B 17/56* | (2021.01) | |
| *F16M 13/02* | (2006.01) | |
| *F16M 11/20* | (2006.01) | |
| *F16M 11/04* | (2006.01) | |
| *F16M 11/10* | (2006.01) | |
| *F16M 11/18* | (2006.01) | |
| *F16M 11/12* | (2006.01) | |
| *F16M 11/38* | (2006.01) | |
| *F16M 11/42* | (2006.01) | |

(52) U.S. Cl.
CPC ........... *G03B 17/561* (2013.01); *F16M 11/04* (2013.01); *F16M 11/10* (2013.01); *F16M 11/12* (2013.01); *F16M 11/18* (2013.01); *F16M 11/2042* (2013.01); *F16M 11/2092* (2013.01); *F16M 13/022* (2013.01); *G03B 17/56* (2013.01); *F16M 11/38* (2013.01); *F16M 11/42* (2013.01); *F16M 2200/044* (2013.01); *F16M 2200/065* (2013.01); *F16M 2200/068* (2013.01)

(58) Field of Classification Search
CPC ........ G03B 17/56; F16M 11/04; F16M 11/12; F16M 11/10; F16M 11/18
USPC .......................................................... 396/428
See application file for complete search history.

(56) References Cited

U.S. PATENT DOCUMENTS 4,907,768 A * 3/1990 Masseron ............. B66F 11/048
212/197
4,943,019 A * 7/1990 Mester .................. B66F 11/048
248/123.11

(Continued)

OTHER PUBLICATIONS

Written Opinion of the International Search Authority, PCT/GB2005/004762, Telescopic Crane, dated Dec. 9, 2005, 6 pages (Year: 2005).*

(Continued)

*Primary Examiner* — Clayton E. LaBalle
*Assistant Examiner* — Kevin C Butler
(74) *Attorney, Agent, or Firm* — Perkins Coie LLP; Kenneth H. Ohriner

(57) ABSTRACT

A lightweight camera crane has an outer arm pivotally attached to a base. A moving counterweight carriage is supported on carriage rollers on top of the outer arm. An inner arm is supported on arm rollers within the outer arm. An electric extension motor drives telescoping extension and retraction movement of the inner arm via chains, belts or cables connected to the counterweight carriage and the inner arm. An electrical power unit is supported at a back end of the outer arm. The electrical power unit includes a rechargeable battery for powering the electric extension motor.

14 Claims, 11 Drawing Sheets

(56) References Cited

U.S. PATENT DOCUMENTS

| | | | | |
|---|---|---|---|---|
| 4,952,953 A * | 8/1990 | Ridderstolpe | B66F 11/048 | 248/364 |
| 5,192,963 A * | 3/1993 | Hill | B66F 11/048 | 248/280.11 |
| 5,492,353 A * | 2/1996 | Chapman | B60G 99/00 | 280/124.127 |
| 5,781,814 A * | 7/1998 | Chapman | B66F 11/048 | 396/419 |
| 6,450,706 B1 * | 9/2002 | Chapman | B66F 11/048 | 212/195 |
| 6,820,980 B1 * | 11/2004 | Romanoff | B66F 11/048 | 248/187.1 |
| 7,121,745 B2 * | 10/2006 | Chapman | B66F 11/048 | 396/428 |
| 7,128,479 B2 | 10/2006 | Chapman | | |
| 7,390,131 B2 * | 6/2008 | Schaller | F16M 11/08 | 396/421 |
| 8,033,742 B1 * | 10/2011 | Chapman | F16M 11/42 | 396/428 |
| 8,251,599 B2 * | 8/2012 | Chapman | F16M 11/18 | 396/428 |
| 8,333,520 B1 * | 12/2012 | Cronin | F16M 11/18 | 396/428 |
| 8,465,103 B2 | 6/2013 | Burt et al. | | |
| 8,550,632 B2 | 10/2013 | Chapman | | |
| 8,764,060 B2 | 7/2014 | Chapman | | |
| 8,870,197 B2 | 10/2014 | John | | |
| 9,440,832 B2 * | 9/2016 | Valles Navarro | B66F 13/00 | |
| 9,507,244 B2 * | 11/2016 | Chapman | B66F 11/048 | |
| 9,638,986 B1 * | 5/2017 | Chapman | G03B 17/561 | |
| 11,099,464 B2 | 8/2021 | Chapman | | |
| 2003/0076480 A1 * | 4/2003 | Burbulla | B66F 11/048 | 352/243 |
| 2005/0007553 A1 * | 1/2005 | Romanoff | F16M 11/18 | 352/243 |
| 2005/0191049 A1 * | 9/2005 | Chapman | B66F 11/048 | 396/428 |
| 2005/0191050 A1 * | 9/2005 | Chapman | F16M 11/42 | 396/428 |
| 2007/0230947 A1 * | 10/2007 | Chapman | F16M 11/18 | 396/428 |
| 2008/0002967 A1 * | 1/2008 | Chapman | B66F 11/048 | 396/428 |
| 2008/0264886 A1 * | 10/2008 | Adamiec | B66F 11/046 | 212/196 |
| 2009/0097840 A1 * | 4/2009 | Amadril | G03B 17/561 | 396/428 |
| 2011/0031203 A1 * | 2/2011 | Chapman | B66C 23/701 | 212/196 |
| 2011/0200320 A1 * | 8/2011 | Chapman | F16M 11/10 | 396/428 |
| 2011/0273612 A1 * | 11/2011 | Chapman | G03B 17/561 | 348/373 |
| 2011/0280565 A1 * | 11/2011 | Chapman | G03B 17/561 | 396/428 |
| 2012/0026467 A1 * | 2/2012 | Chapman | F16M 11/18 | 352/243 |
| 2012/0070143 A1 * | 3/2012 | Chapman | B66F 11/048 | 396/428 |
| 2012/0120371 A1 * | 5/2012 | Chapman | F16M 11/28 | 352/243 |
| 2012/0152630 A1 * | 6/2012 | Chapman | B66F 11/048 | 180/24.07 |
| 2012/0269504 A1 * | 10/2012 | Chapman | F16M 11/18 | 396/428 |
| 2013/0183028 A1 * | 7/2013 | Chapman | G03B 17/561 | 396/428 |
| 2013/0322996 A1 * | 12/2013 | Chapman | B60P 1/433 | 414/495 |
| 2014/0021422 A1 * | 1/2014 | Chapman | G03B 17/561 | 254/93 R |
| 2015/0171632 A1 | 6/2015 | Fry et al. | | |
| 2016/0195798 A1 * | 7/2016 | Nenov | H04N 5/2251 | 348/373 |
| 2016/0250959 A1 * | 9/2016 | Blanchard | B60P 1/5423 | 414/549 |
| 2016/0299411 A1 * | 10/2016 | Chapman | B66F 11/048 | |
| 2016/0377224 A1 * | 12/2016 | Vance | F16M 11/048 | 396/428 |
| 2017/0023849 A1 * | 1/2017 | Chapman | B66F 11/048 | |
| 2017/0184249 A1 * | 6/2017 | Chapman | B62D 55/06 | |
| 2017/0205688 A1 * | 7/2017 | Chapman | G03B 17/561 | |
| 2017/0222474 A1 | 8/2017 | Kefalos et al. | | |
| 2019/0337785 A1 * | 11/2019 | Chapman | F16M 11/18 | |
| 2021/0318595 A1 * | 10/2021 | Chapman | F16M 11/2092 | |

OTHER PUBLICATIONS

International Search Report, PCT/GB2005/004762, Telescopic Crane, dated Jun. 15, 2006, 12 pages (Year: 2006).*

* cited by examiner

TELESCOPING ELECTRIC CAMERA CRANE

BACKGROUND OF THE INVENTION

The field of the invention is camera cranes. Camera cranes are often used in motion picture and television production. The motion picture or television camera is typically mounted on the front end of a crane arm with counterweights at the back end of the crane arm. The crane arm is pivotally supported on a base to allow the crane arm to tilt up and down and pan from side-to-side. The base is typically supported on a camera dolly, wheeled mobile base, or truck.

Telescoping camera cranes have a telescoping arm that can extend and retract, providing far more capability than fixed length crane arms. However, existing telescoping camera cranes generally weigh several hundred kilograms, which exceeds the safe load carrying capacity of small portable camera dollies. Consequently, for filming in confined or less accessible spaces where only a small portable camera dolly can be used, historically there have been limited telescoping camera crane designs.

Of course, existing telescoping camera cranes can be made smaller which also makes them lighter. However, regardless of the size, the camera crane must be able to consistently hold the camera (and various associated payloads such as a remote camera head) in a steady position, even with the arm fully extended. As the camera crane size is reduced, the smaller structural components of the camera crane have reduced capability to resist unintended or undesirable camera movements, due to bending, flexing, twisting, or vibration.

Various types of electric telescoping camera cranes have been used in the past. These types of camera cranes typically use wall current or a remote battery to operate one or more electric motors to drive the telescoping operation. Using wall current requires connecting the crane to a power source via a cable, which can limit the flexibility of use of the crane. Accordingly, engineering challenges remain in designing a lightweight and compact telescoping camera crane.

SUMMARY OF THE INVENTION

In one aspect, a camera crane includes a base, an outer arm pivotally attached to the base, and a counterweight carriage supported on the outer arm on carriage rollers. An inner arm is telescopically supported within the outer arm on arm rollers. An electric extension motor is supported on the outer arm. A tension element, such as a chain or cable, is pulled via a sprocket on an electric extension motor. The tension element is attached to the counterweight carriage and to the inner arm. A nose frame is attached to a front end of the inner arm. A mounting plate is pivotally attached to the nose frame. At least one electric leveling motor operates to keep the mounting plate level.

An electrical power unit is supported at a back end of the outer arm. The electrical power unit includes a battery electrically connectable to the electric extension motor. The electrical power unit may include an AC to DC converter electrically connectable to the electric extension motor, and generally has an AC input connector and at least one DC output connector providing electrical power suitable for operating the electric leveling motor. The electrical power unit includes a housing having a battery section and a charger section oriented perpendicular to the battery section. The battery section may be parallel to a longitudinal axis of the outer arm and with the charger section perpendicular to the longitudinal axis of the outer arm.

Other aspects and features are shown in the drawings, which show one example of how the lightweight camera crane may be designed, and which are not intended to specify a limit on the scope of the invention.

BRIEF DESCRIPTION OF THE DRAWINGS

In the drawings, the same element number indicates the same element in each of the views.

DETAILED DESCRIPTION OF THE DRAWINGS

Figure 1:
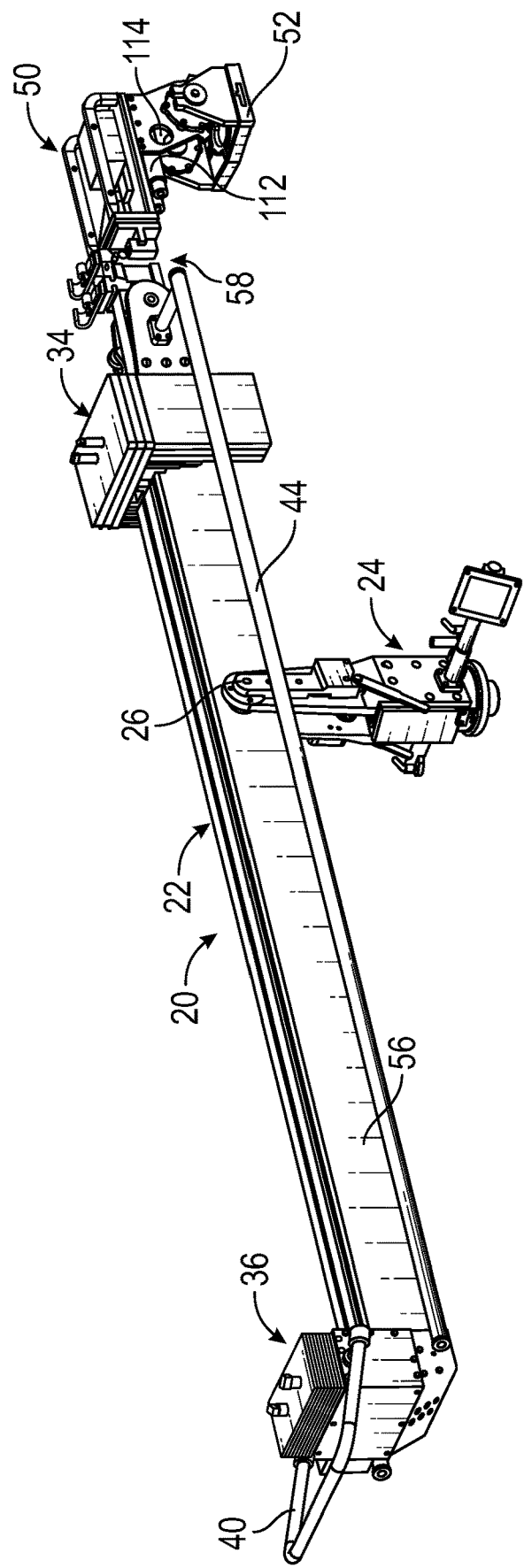
FIG. 1 is a top, rear and right side perspective view of a prior art lightweight telescoping camera crane.
Figure 2:
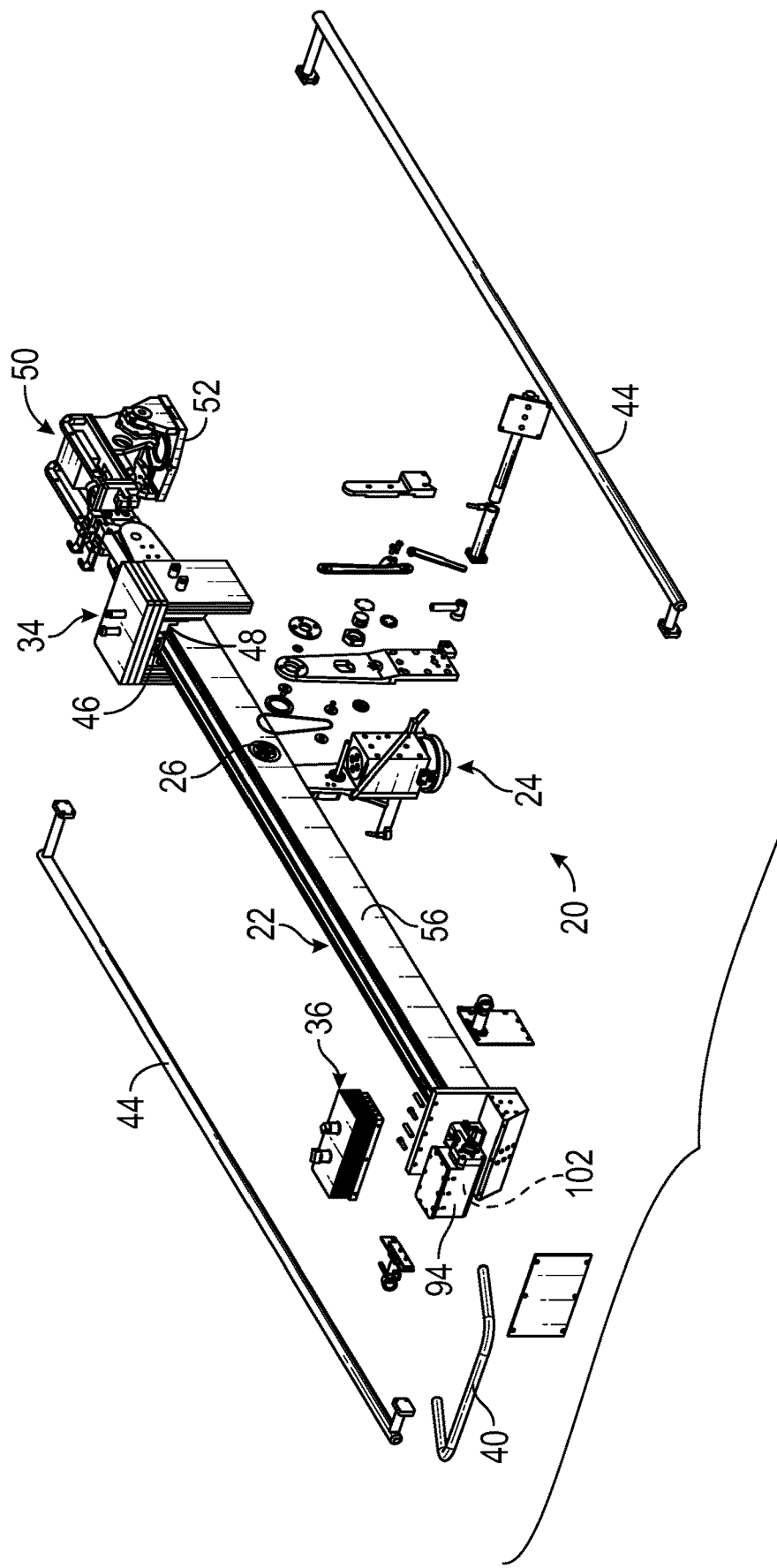
FIG. 2 is an exploded perspective view of the prior art camera crane as it is shown in FIG. 1.
Figure 3:
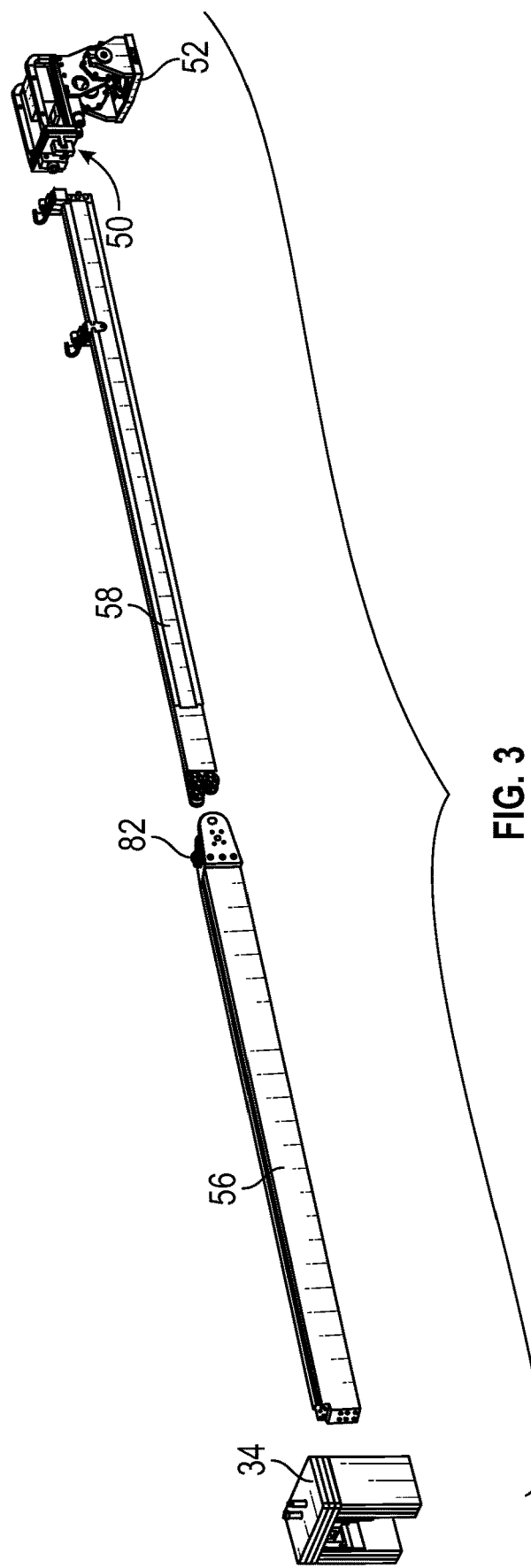
FIG. 3 is a similar exploded perspective view of major elements of the prior art camera crane shown in FIGS. 1 and 2, with components removed for purpose of illustration.
Figure 4:
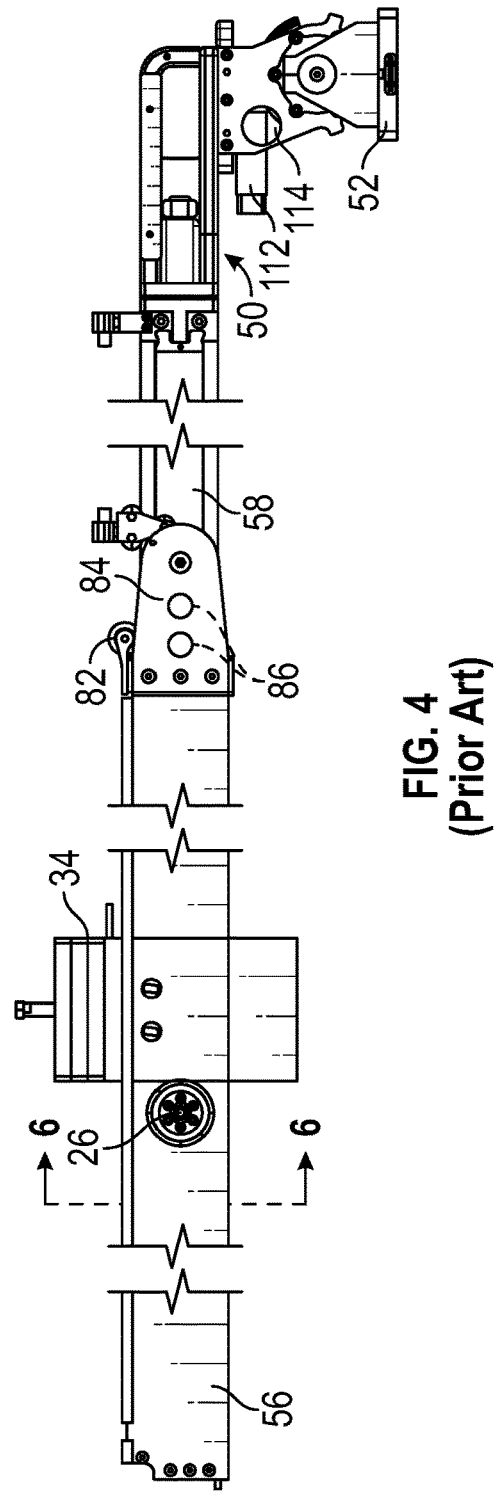
FIG. 4 is a side view of the prior art camera crane of FIGS. 1 and 2 with the base and trim weight platform removed.
Figure 6:
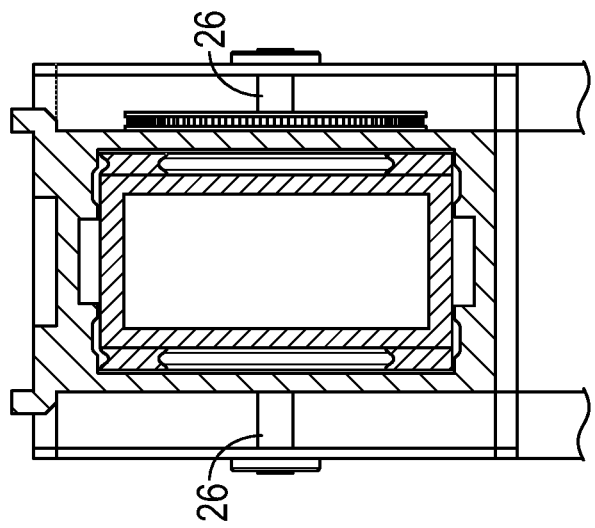
FIG. 6 is a section view taken along line 6-6 of FIG. 4, with the counterweight carriage removed.

FIGS. 1-7 show a camera crane as disclosed in Chapman U.S. Pat. No. 9,507,244, incorporated herein by reference. As shown in FIGS. 1 and 2, a camera crane 20 has a crane arm 22 including an outer arm 56 and an inner arm 58 telescopically extendible into and out of the outer arm 56. The base has a left base plate 30 on a left side of the outer arm and a right base plate 30 on a right side of the outer arm, with the outer arm 56 pivotally attached to a base 24 via left and right axles 26 on the left and right base plates 30. Handles are attached to the outer arm 56, such as a rear handle 40 and side handles 44, to allow the crane arm 22 to be easily grasped, moved, or held into a desired position. A nose frame 50 is rigidly attached, e.g., bolted, onto the front end of the inner arm. The camera 406 is attached to the mounting plate 52. The nose frame 50 may be magnesium, to reduce weight. Referring now also to FIGS. 3 and 4, one or more tilt motors 112 acting through a tilt gear drive or linkage 114 pivot the mounting plate 52 as required to keep the mounting plate (and the camera on the mounting plate) level, regardless of the tilt angle of the crane arm 22.

Figure 5B:
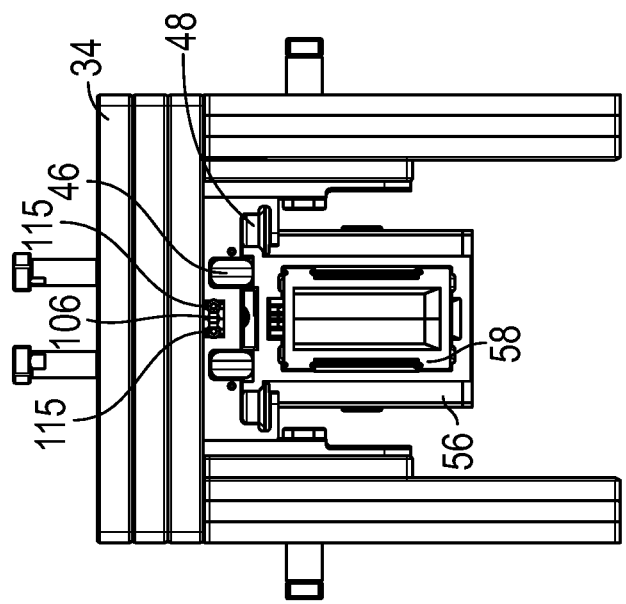
FIG. 5B is a view similar to FIG. 5A but with the nose assembly removed, for purpose of illustration.
Figure 5A:
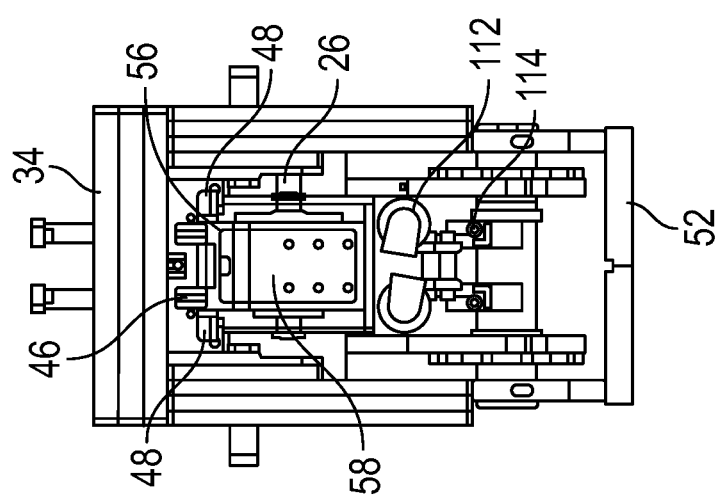
FIG. 5A is a rear view of the prior art camera crane of FIG. 4.

A counterweight carriage 34 rolls on a top surface of the outer arm 56 to keep the crane arm 22 balanced as the inner arm 58 extends and retracts. Specifically, as shown in FIGS. 2 and 5B, the counterweight carriage 34 has top rollers 46 which roll on a top surface of the outer 56, and side rollers 48 which roll on the sides of the outer arm 56. The counterweight carriage 34 typically carries a fixed number of counterweight plates 37 selected so that the crane arm 22 is balanced regardless of the position of the inner arm, with a minimum payload or no payload on the mounting plate 52. The weights on the counterweight carriage may be changed as needed if the nose frame 50 is replaced with a heavier or lighter nose assembly.

As shown in FIGS. 1 and 2, a trim weight tray 36 is attached to the back end of the outer arm 56. Trim weight plates are added to or removed from the trim weight tray to balance the crane arm 22 after the payload is attached to the nose frame 50 and the camera crane 20 is ready for use. Sliding or rolling trim weights may be provided on the side handles for making small balance adjustments.

Figure 7:
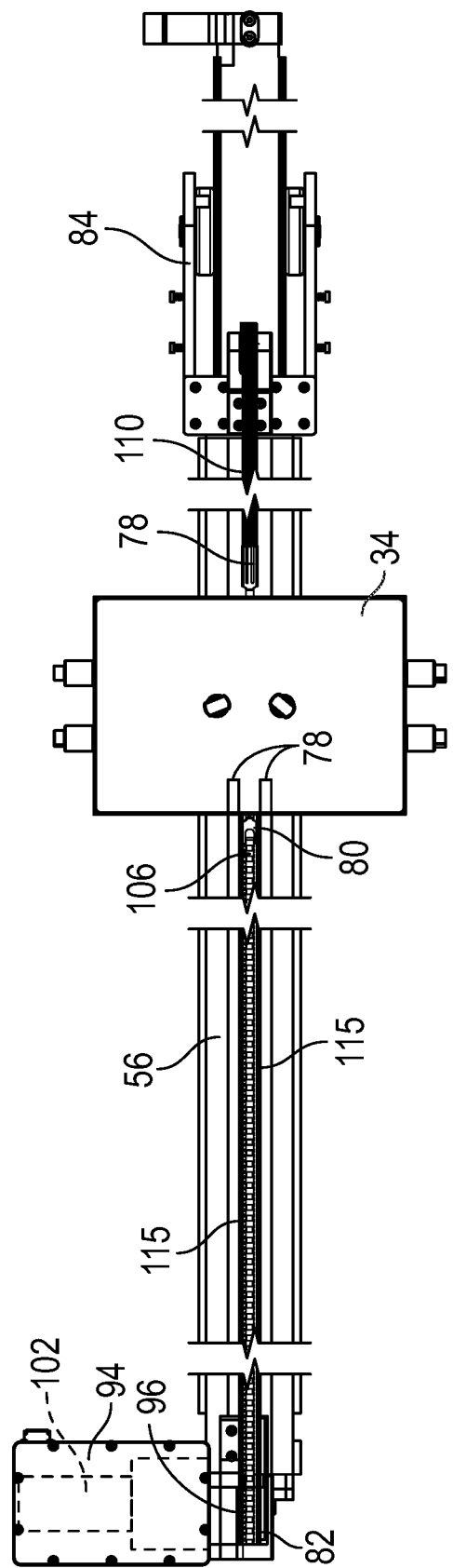
FIG. 7 is a top view of the prior art crane shown in FIGS. 1-6.

Referring now to FIG. 2, an extension motor 102 drives a sprocket through a gear drive within a motor enclosure 94 at the back end of the outer arm 56. The gear reduction may have a drive ratio of 2-6, to allow for manually moving the inner arm by back driving the motor. A first end of a chain 106 is attached to the back end of the counterweight carriage 34. The chain wraps around the sprocket with the other end of the chain attached to the back end of the inner arm 58. As shown in FIG. 7, two rear cables 115 run alongside of the chain 106, with one end of each cable attached to the back end of the counterweight carriage 34 via a cable anchor 78, and with the other end of each cable attached to near the back end of the inner arm. The chain and cable anchors allow tension to be adjusted.

A first end of each of a group of three front cables 110 is attached to a front end of the counterweight carriage 34 via a first cable anchor 78, with the cables running over pulleys 82 on the front end of the outer arm 56, and with second end of each front cable 110 attached to the inner arm 58 via a second cable anchor 78 adjacent to, and in front of, the first chain anchor 80. The chain 106 may be replaced by a belt and the front cables 110 may be replaced by a chain or belt. The chain may be a silent chain having stacked rows of flat tooth-shaped driving links meshed with the sprocket. The extension motor 102 is powered via an electrical cable connected to batteries or other power supply typically carried on the camera dolly. The extension motor 102 may be controlled via a wireless controller carried by the crane operator, or via a hand control attached or tethered to the camera crane 20.

The inner arm is telescopically extended using a wired or wireless control which controls the extension motor 102. When the motor is actuated to extend, the extension motor 102 turns the sprocket causing the chain 106 to pull the counterweight carriage 34 towards the rear of the crane arm 22. Simultaneously, the front cables 110 pull the inner arm forward, extending the inner arm. The extension motor 102 and gear drive 96 may be selected so that they can be readily back-driven, by pushing or pulling on inner arm 58 with a nominal force of e.g., 90 to 225 Newtons. This allows the inner arm 58 to be manually telescopically moved in or out, without using the motor.

The arm is retracted by operating the extension motor 102 in the reverse direction, with the chain 106 pulling the inner arm back into the outer arm, and with the front cables pulling the counterweight carriage towards the front of the crane arm 22. The electronic controller of the extension motor 102 may be linked to sensors which detect the position of the counterweight carriage, to decelerate the counterweight carriage automatically as it approaches the front or rear limit of travel. In the example shown with an outer arm 56 about length of about 300 cm, the inner arm travel is about 215 cm.

Figure 10:
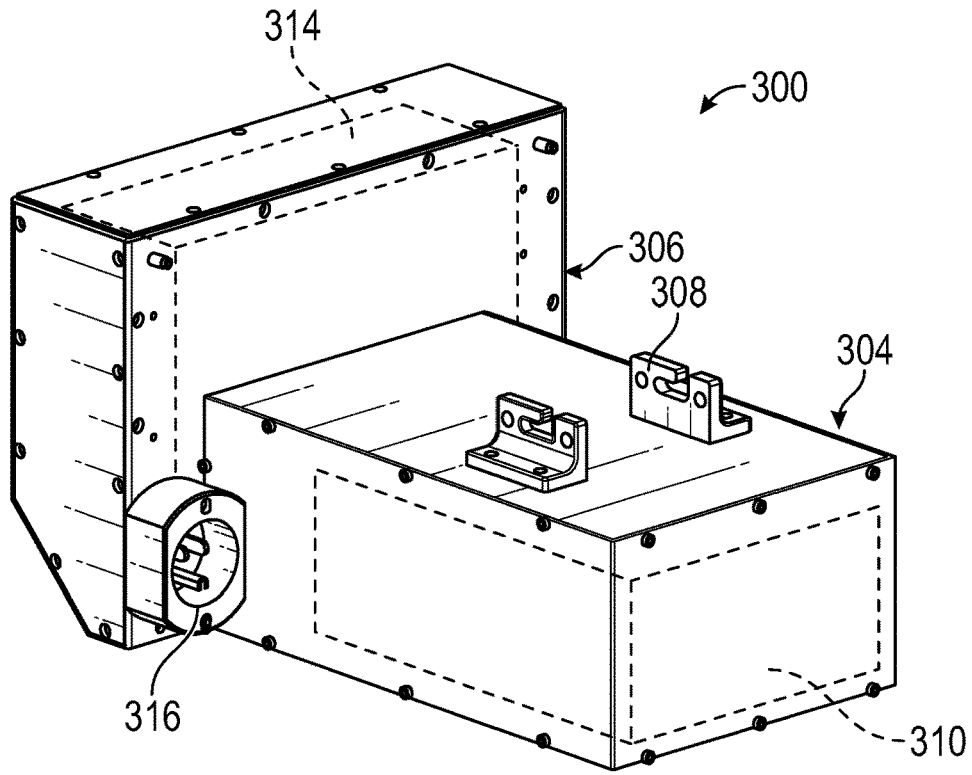
FIG. 10 is a perspective view of the electrical unit shown in FIGS. 8 and 9.
Figure 11:
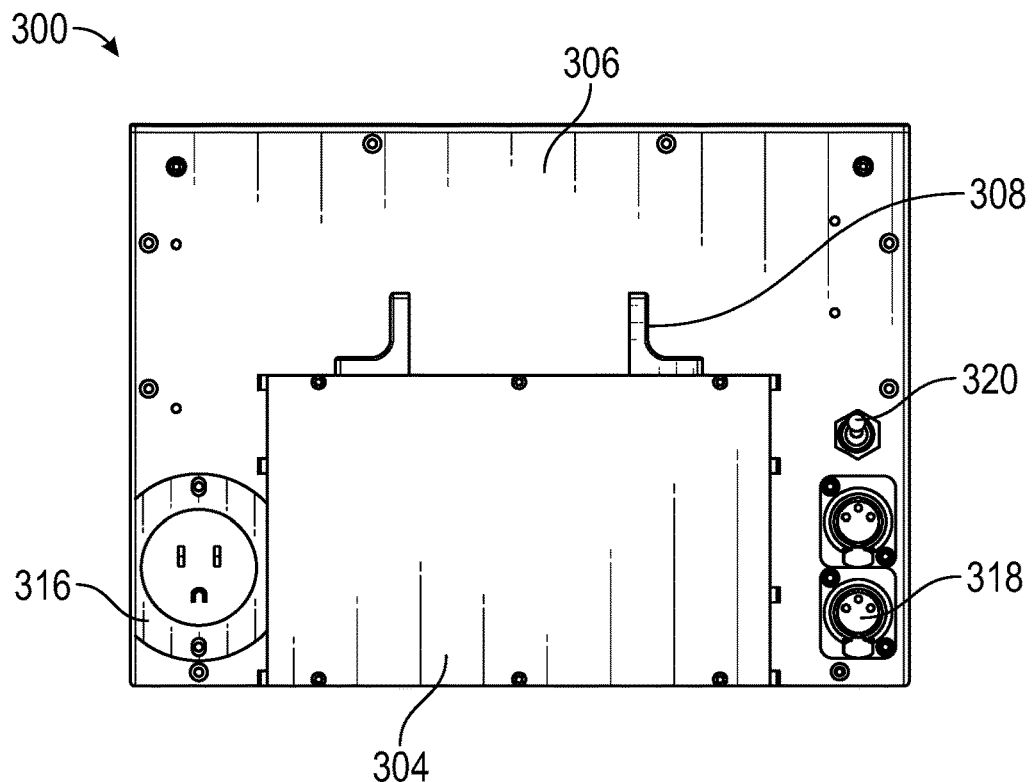
FIG. 11 is a front view of the electrical unit shown in FIG. 8.
Figure 12:
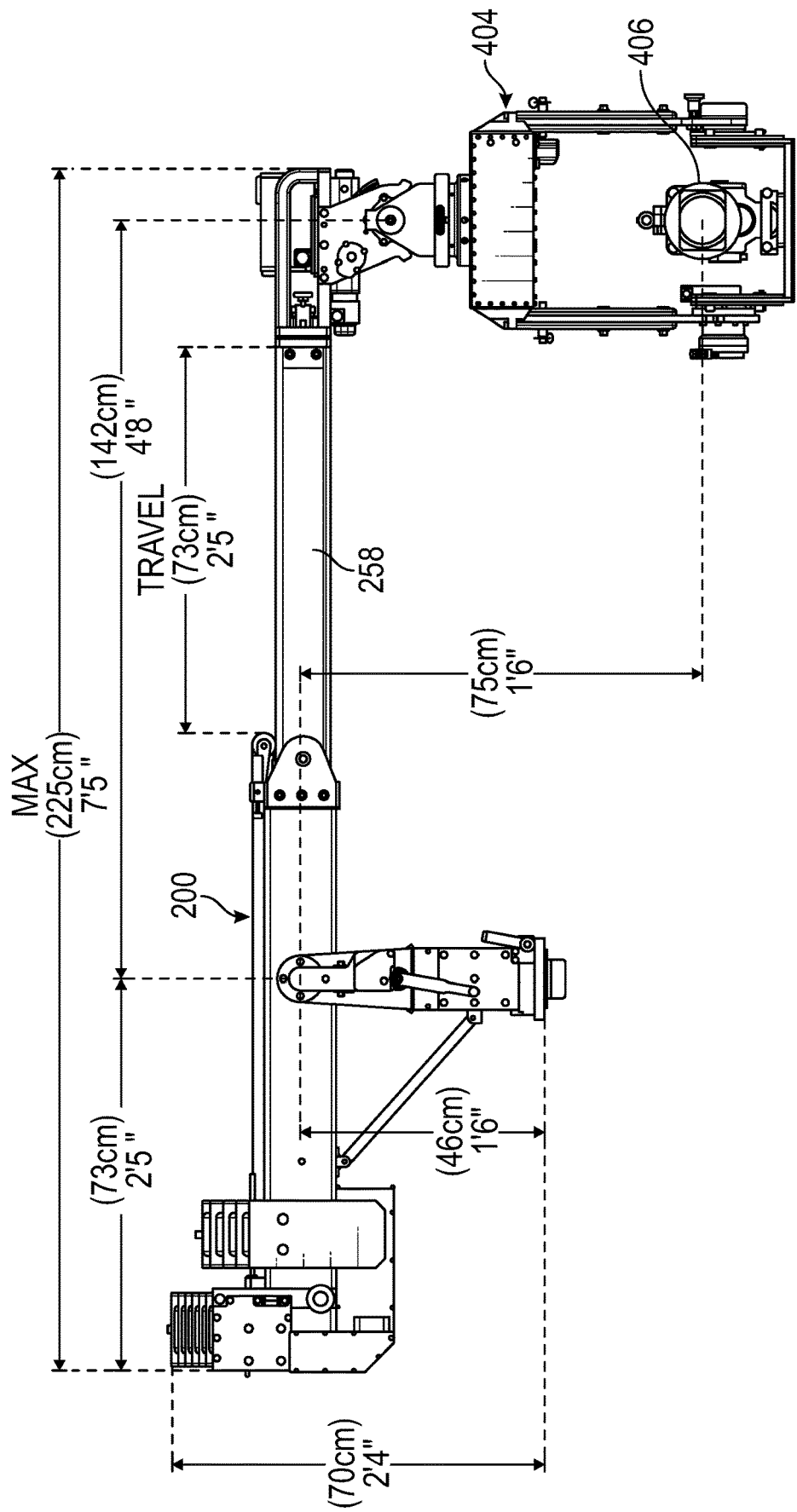
FIG. 12 is a side view showing examples of dimensions of the camera crane of FIGS. 8-11.

Turning to FIGS. 8-15, a new camera crane 200 may be similar or the same as the camera crane shown in FIGS. 1-7, except as described below. The camera crane 200 has an inner tube 258 telescopically movable into and out of an outer tube 256. The inner tube 258 and the outer tube 256 may have the same size and cross section as the inner and outer tubes 58 and 56, except they are much shorter. For example, as shown in FIG. 12, the inner and outer tubes 258 and 256 form a camera crane 200 having an overall extended total length of about 200 to 230 cm (nominally 215 cm), and an overall retracted length of about 130 to 170 cm (nominally 153 cm), including the nose frame 250. The nose frame 250 on the camera crane 200 is proportionally smaller than the nose frame 50. As a result, the camera crane 200 is highly compact and can be used in spaces providing little room to operate, particularly indoor spaces, such as a typical bedroom or bathroom. As shown also in FIG. 12, the inner tube 258 has a telescoping travel range of about 60 to 85 cm (nominally 73 cm). Since the camera crane 200 is shorter than the camera crane 20 shown in FIGS. 1-7, the inner tube 258 may be supported on a single pair of front rollers at the front end of the outer tube, rather than the two pairs of rollers 86 shown in FIG. 4.

Figure 8:
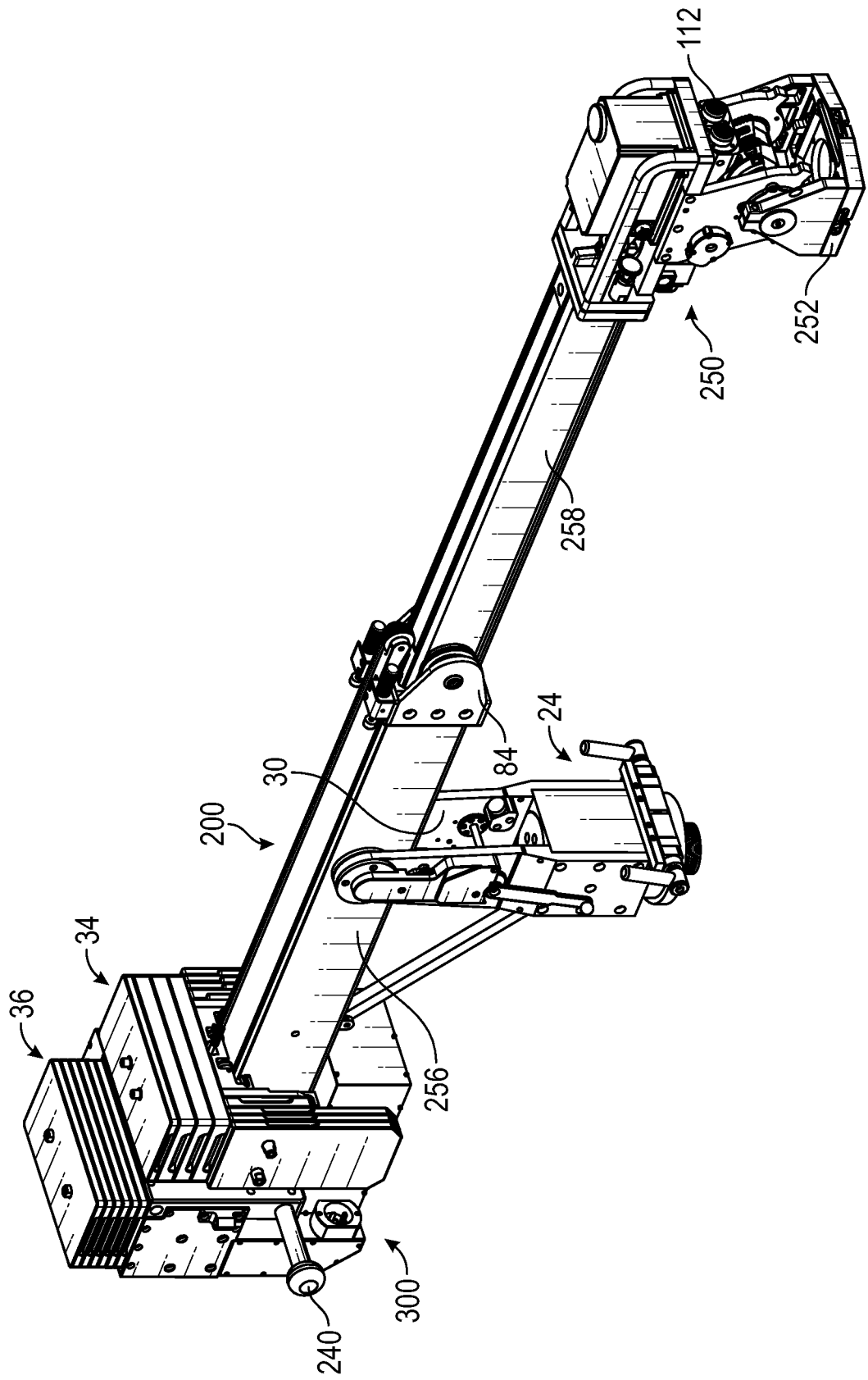
FIG. 8 is a perspective view of a new camera crane similar in aspects to the design shown in FIGS. 1-7 and further including an electrical unit.
Figure 9:
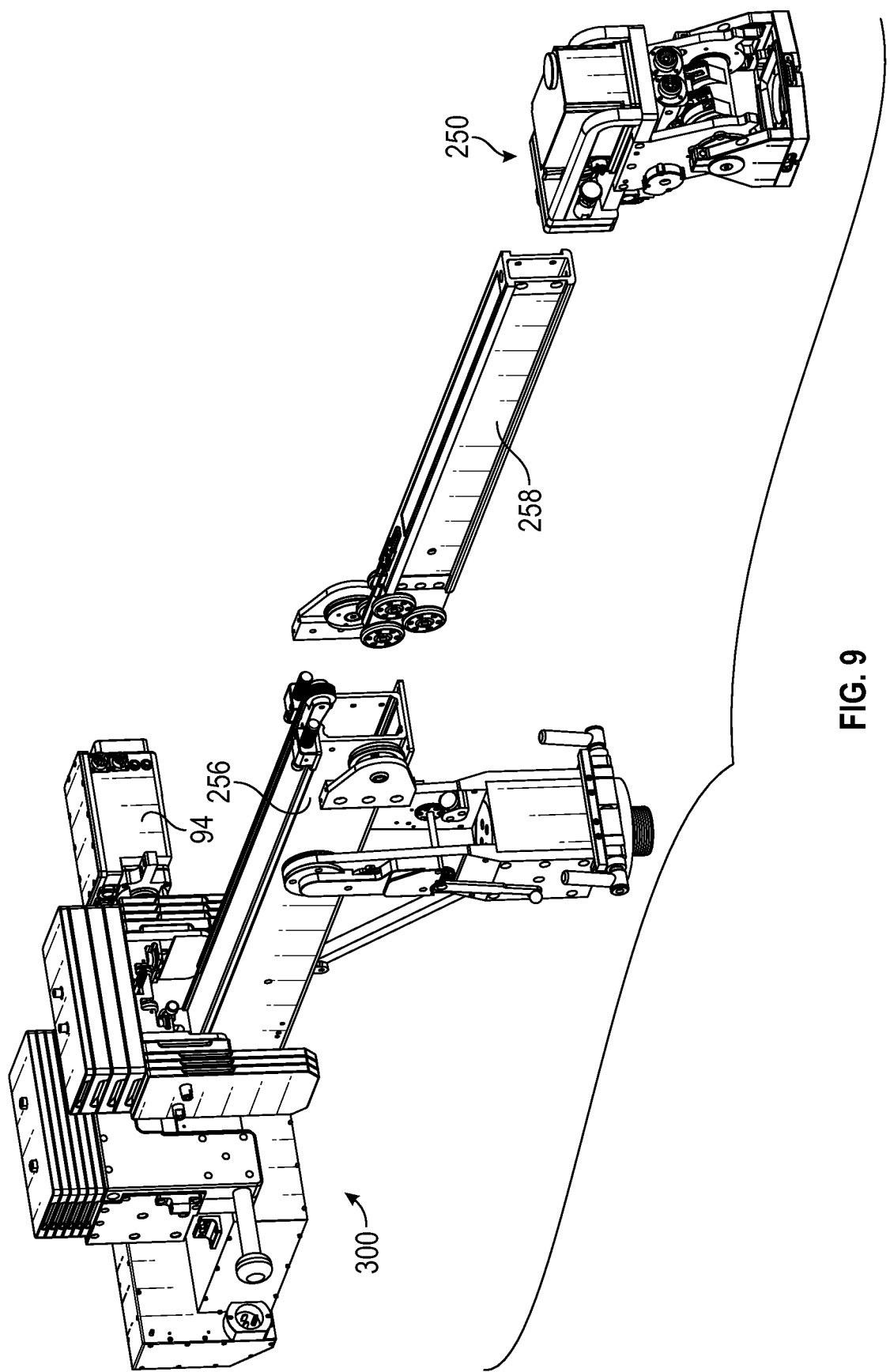
FIG. 9 is an exploded perspective view of the camera crane of FIG. 8.

As shown in FIGS. 9-11, an electrical unit 300 is attached to the back end of the camera crane 200. The electrical unit 300 has a housing 302 including a battery section 304 and a charger section 306. Brackets or hooks 308 on the top surface of the battery section 304 may be used to attach the electrical unit 300 onto the outer tube 256. Ordinarily though the electrical unit 300 is permanently attached to and a permanent part of the camera crane 200. A rechargeable battery 310, such a 32 or 36 VDC lithium cell battery, is enclosed within the battery section 304 of the housing 302. The battery 310 and the battery section 304 both have a rectangular cross section, as shown in FIG. 10. Charging and switching circuitry is enclosed within the charger section 306 of the housing 302. The charger section 306 may also be generally rectangular. As shown in FIG. 8, the battery section 304 is wider than the outer tube 256, but sufficiently narrow to fit between the side counterweight plates 37 when the counterweight carriage 34 is in the full back position.

Referring to FIG. 11, an AC input socket or connector 316 is provided on one side of the charger section 306 and an on/off switch 320, a DC output connector 318, and a battery charging connector 322 are provided on the other side of the charger section 306. The AC input socket 316 is wired to the AC/DC converter 314 which converts 110/220 VAC wall current to DC which operates the extension motor, if the battery 310 is insufficiently charged. The battery charging connector 322 charges the battery when connected to an external charging source. The switch 320 powers the electrical system on or off.

In ordinary use, with the battery charged, electrical power to the extension motor 102 is provided from the battery 310. The battery may also power the tilt motors 112 via a cable from the connector 318 extending forward to the tilt motors 112 on nose frame 250, or it may be used to provide 32 or 36 VDC to an accessory or to the camera 406. With the battery charged, no power cable from facility wall current or a generator is needed. This allows the camera crane 200 to be used in remote locations, without a generator. It also allows the camera crane 200 to be used anywhere, without the need for a facility power cable or a generator.

The camera crane 200 may optionally be powered by wall current, via a 110/220 VAC cable connected to the socket 316. In this case, the AC current is converted by the AC/DC converter to 32 or 36 VDC which is used to power the extension motor 102, tilt motors 112 and accessories or the camera. Alternatively, an external accessory battery may be used to power the camera crane 200. The charging and switching circuitry automatically detects the power source, if any, connected to the socket 316 and internally switches in the AC/DC converter, as needed.

Figure 13:
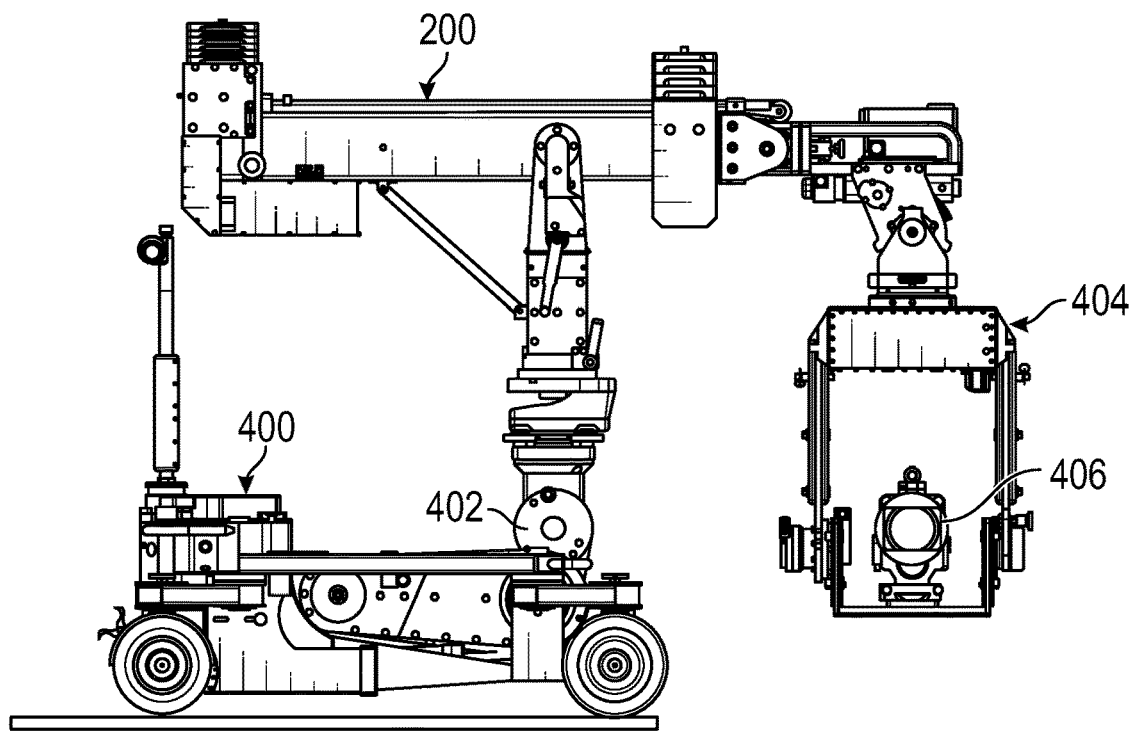
FIG. 13 is a side view of the camera crane of FIGS. 8-12 mounted on a camera dolly, with the camera crane in a fully retracted position and the dolly arm in a fully down position.
Figure 14:
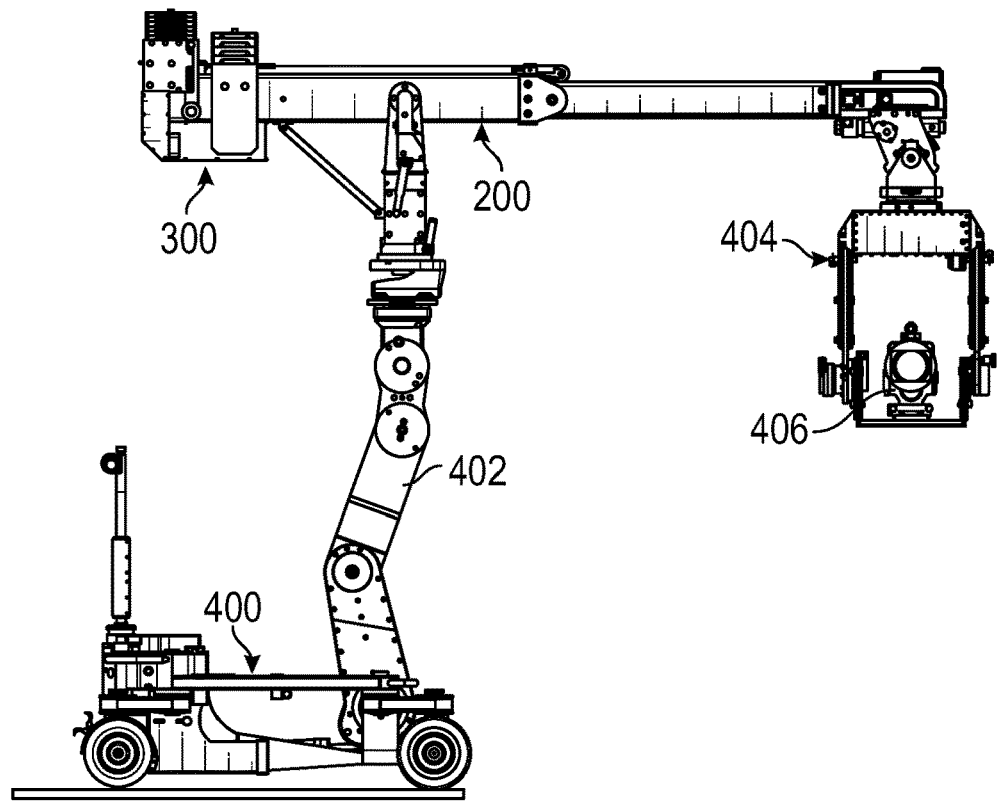
FIG. 14 is a side view of the camera crane of FIGS. 8-12 mounted on a camera dolly, now with the camera crane in a fully extended position and the dolly arm in a fully up position.
Figure 15:
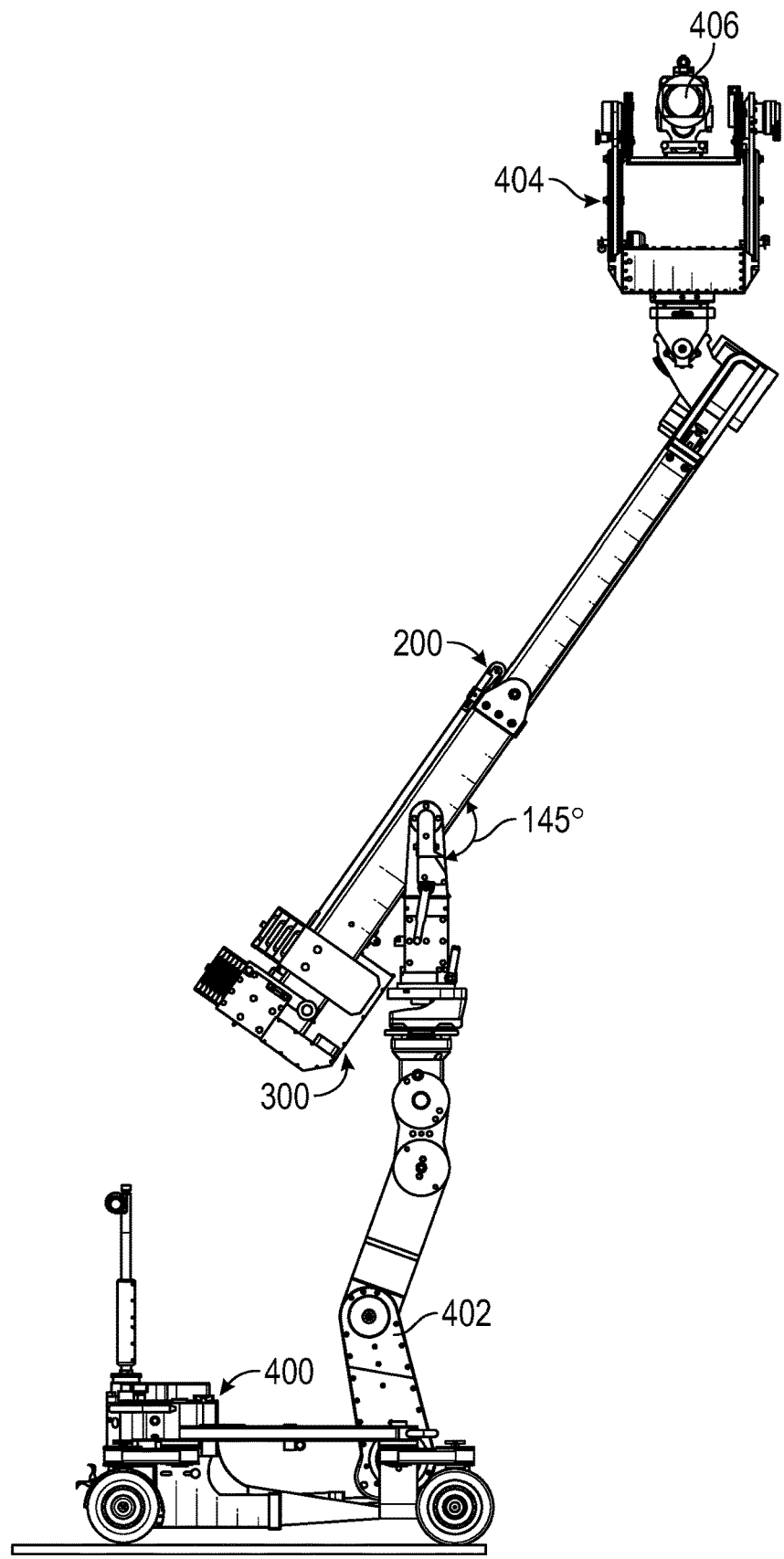
FIG. 15 is a side view of the camera crane of FIGS. 8-12 with a camera on a camera head in an over-slung position.

FIGS. 13-15 show examples of use of the camera crane 200 mounted on a camera dolly 400. FIG. 13 shows the camera crane 200 in a fully retracted position, and the dolly arm 402 in a full down position. A camera head 404 is attached to the mounting plate 52 in the so-called underslung position and a camera 406 is mounted on the camera head 404. FIG. 14 shows the same set up now with the camera crane 200 fully extended and the dolly arm 402 in the full up position. FIG. 15 also shows the camera crane 200 fully extended and the dolly arm 402 in the full up position, but with the camera crane 200 tilted up and with the camera head in the so-called over-slung position.

In an alternative design, the extension motor is operated only by the battery. The battery is charged by connecting 110/220 AC to the camera crane, wherein it is converted to 32 or 36 VDC for charging the battery. In this design, there is no direct electrical connection from the AC converting circuit to the extension motor.

Thus, a novel camera crane has been shown and described. Various changes and modifications may be made without departing from the spirit and scope of the invention. The invention, therefore, should not be limited, except by the following claims and their equivalents.

The invention claimed is:

1. A camera crane, comprising:
a base;
an outer arm pivotally attached to the base;
a counterweight carriage supported on the outer arm on carriage rollers;
an inner arm telescopically supported within the outer arm on arm rollers;
an electric extension motor supported on the outer arm;
a tension element engaged with the electric extension motor, the tension element attached to the counterweight carriage and to the inner arm;
a nose frame attached to a front end of the inner arm;
a mounting plate pivotally attached to the nose frame;
at least one electric leveling motor linked to the mounting plate; and
an electrical power unit attached at a back end of the outer arm, the electrical power unit including a battery electrically connected to the electric extension motor.

2. The camera crane of claim 1 with the electrical power unit including a housing having a battery section and a charger section oriented perpendicular to the battery section with the battery section parallel to a longitudinal axis of the outer arm and with the charger section perpendicular to the longitudinal axis of the outer arm.

3. The camera crane of claim 2 wherein the battery is a 32 VDC rectangular lithium battery.

4. The camera crane of claim 3 further including left and right side counterweight plates on the counterweight carriage, the battery section between the left and right side counterweight plates when the inner arm is fully telescopically retracted into the outer arm.

5. The camera crane of claim 1 including a sprocket attached to the electric extension motor, wherein the tension element comprises a silent chain having stacked rows of flat tooth-shaped driving links meshed with the sprocket.

6. The camera crane of claim 1 having a length, including the nose frame, of 130 to 170 cm.

7. The camera crane of claim 6 wherein the inner arm has a travel distance of 60 to 80 cm.

8. The camera crane of claim 1 wherein the tension element comprises a first tension element engaged with the electric extension motor and having a first end attached to the counterweight carriage, and a second end attached to the inner arm, and a second tension element having a first end attached to the counterweight carriage and a second end attached to the inner arm.

9. The camera crane of claim 8 wherein the first tension element comprises a chain around a sprocket on the extension motor, and the second tension element comprises one or more cables passing over pulleys at a front end of the outer arm.

10. The camera crane of claim 1 with base having left base plate on a left side of the outer arm and a right base plate on a right side of the outer arm, with the outer arm pivotally attached to the base via left and right axles on the left and right base plates.

11. The camera crane of claim 1 wherein inner arm is telescopically supported at the front end of the outer arm only by a single front left roller and a single front right roller.

12. A camera crane, comprising:
a base;
an outer arm pivotally attached to the base;
a counterweight carriage supported on the outer arm, on carriage rollers;
a single inner arm telescopically supported within the outer arm only via front rollers at the front end of the outer arm and by rear rollers at the rear end of the inner arm;
an electric extension motor on the outer arm;
a silent chain engaged with the electric extension motor and having a first end attached to the counterweight carriage, and a second end attached to the inner arm;
at least one cable or chain having a first end attached to the counterweight carriage and a second end attached to the inner arm;
a nose frame rigidly attached to a front end of the inner arm;
a mounting plate pivotally attached to the nose frame;
an electric leveling motor on the nose frame linked to the mounting plate;
an electrical power unit including a housing having a battery section containing a battery and a charger section oriented perpendicular to the battery section, at least one bracket on a top surface of the battery section attaching the electrical power unit to a back end of the outer arm, with the battery section parallel to a longitudinal axis of the outer arm and with the charger section perpendicular to the longitudinal axis of the outer arm, the battery electrically connectable to the electric extension motor, the electrical power unit further including an AC input connector and at least one DC output connector.

13. The camera crane of claim 12 including left and right side counterweight plates on the counterweight carriage, the battery section between the left and right side counterweight plates when the inner arm is in a fully telescopically retracted position.

14. A camera crane, comprising:
a base;
an outer arm pivotally attached to the base;
a counterweight carriage supported on the outer arm on carriage rollers;
an inner arm telescopically supported within the outer arm on arm rollers;
an electric extension motor supported on the outer arm;
a tension element engaged with the electric extension motor, the tension element attached to the counterweight carriage and to the inner arm;
a nose frame attached to a front end of the inner arm;
a mounting plate pivotally attached to the nose frame;
at least one electric leveling motor linked to the mounting plate; and
an electrical power unit supported at a back end of the outer arm, the electrical power unit including a battery electrically connected to the electric extension motor, the electrical power unit including a battery, an AC to DC converter electrically connectable to the electric extension motor, the electrical power unit further including an AC input connector and at least one DC output connector providing electrical power suitable for operating the electric leveling motor.

\* \* \* \* \*